US009742191B2

(12) United States Patent
Beekmann

(10) Patent No.: US 9,742,191 B2
(45) Date of Patent: Aug. 22, 2017

(54) METHOD FOR CONTROLLING AN ARRANGEMENT FOR SUPPLYING ELECTRIC CURRENT TO A POWER SUPPLY SYSTEM

(71) Applicant: Wobben Properties GmbH, Aurich (DE)

(72) Inventor: Alfred Beekmann, Wiesmoor (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 324 days.

(21) Appl. No.: 14/385,380

(22) PCT Filed: Mar. 8, 2013

(86) PCT No.: PCT/EP2013/054794
§ 371 (c)(1),
(2) Date: Sep. 15, 2014

(87) PCT Pub. No.: WO2013/135592
PCT Pub. Date: Sep. 19, 2013

(65) Prior Publication Data
US 2015/0069836 A1    Mar. 12, 2015

(30) Foreign Application Priority Data

Mar. 16, 2012    (DE) .................. 10 2012 204 220

(51) Int. Cl.
*H02J 1/10*     (2006.01)
*H02J 3/46*     (2006.01)
(Continued)

(52) U.S. Cl.
CPC .............. *H02J 3/28* (2013.01); *F03D 7/0284* (2013.01); *H02J 3/14* (2013.01); *H02J 3/386* (2013.01);
(Continued)

(58) Field of Classification Search
CPC ............ H02J 3/28; H02J 3/386; F03D 7/0284
(Continued)

(56) References Cited

U.S. PATENT DOCUMENTS 6,891,281 B2    5/2005    Wobben
6,965,174 B2    11/2005    Wobben
(Continued)

FOREIGN PATENT DOCUMENTS

CL          9702012         8/2012
CN        100438257 C      11/2008
(Continued)

OTHER PUBLICATIONS

Carrasco et al., "Power-Electronic Systems for the Grid Integration of Renewable Energy Sources: A Survey," *IEEE Transactions on Industrial Electronics* 53(4):1002-1016, Aug. 2006.

*Primary Examiner* — Carlos Amaya
(74) *Attorney, Agent, or Firm* — Seed IP Law Group LLP

(57) ABSTRACT

The invention relates to a method for controlling a feed arrangement having a wind energy installation for feeding electrical power into an electrical supply system, comprising the following steps: generating electrical power using the wind energy installation from wind, feeding a first proportion of the generated electrical power into the electrical supply system, supplying a second proportion of the generated electrical power to an electrical consumer for consuming the supplied second proportion of the generated electrical power, and wherein, depending on at least one monitored system state and/or depending on the prevailing wind, the second proportion of the generated electrical power which is supplied to the consumer is reduced wholly or partially and the first proportion of the electrical power fed into the electrical supply system is increased correspondingly, and to a corresponding feed arrangement.

19 Claims, 3 Drawing Sheets

(51) Int. Cl.
  *H02J 3/28* (2006.01)
  *H02J 3/14* (2006.01)
  *H02J 3/38* (2006.01)
  *F03D 7/02* (2006.01)

(52) U.S. Cl.
  CPC ......... *Y02B 70/3225* (2013.01); *Y02E 10/763* (2013.01); *Y02E 70/30* (2013.01); *Y04S 20/222* (2013.01); *Y04S 20/224* (2013.01); *Y10T 307/352* (2015.04); *Y10T 307/414* (2015.04)

(58) Field of Classification Search
  USPC .......................................................... 307/24
  See application file for complete search history.

(56) References Cited

U.S. PATENT DOCUMENTS

| | | |
|---|---|---|
| 6,984,898 B2 | 1/2006 | Wobben |
| 7,199,482 B2 | 4/2007 | Hopewell |
| 7,462,946 B2 | 12/2008 | Wobben |
| 7,525,208 B2 | 4/2009 | Wobben |
| 2005/0200133 A1 | 9/2005 | Wobben |
| 2008/0001479 A1 | 1/2008 | Dengel et al. |
| 2010/0114395 A1* | 5/2010 | Hinatsu .................. C25B 15/02 700/295 |
| 2011/0175443 A1 | 7/2011 | Koyanagi et al. |
| 2012/0091730 A1 | 4/2012 | Stuermer et al. |
| 2012/0104756 A1 | 5/2012 | Beekmann et al. |
| 2014/0225446 A1 | 8/2014 | Giertz |
| 2015/0115609 A1 | 4/2015 | Bohlen et al. |

FOREIGN PATENT DOCUMENTS

| | | |
|---|---|---|
| DE | 10 2008 052 827 A1 | 5/2010 |
| DE | 10 2009 018 126 A1 | 10/2010 |
| EP | 1 739 824 A2 | 1/2007 |
| EP | 2 411 669 | 2/2012 |
| JP | 9-233705 A | 9/1997 |
| JP | 20009021 A | 1/2000 |
| JP | 2007249341 | 9/2007 |
| JP | 2009-77457 A | 4/2009 |
| JP | 2011103736 A | 5/2011 |
| RU | 2404290 C2 | 11/2010 |
| TW | I225328 B | 12/2004 |
| WO | 03/077398 A2 | 9/2003 |
| WO | 2010/048706 A1 | 5/2010 |
| WO | 2010108910 A2 | 9/2010 |

* cited by examiner

METHOD FOR CONTROLLING AN ARRANGEMENT FOR SUPPLYING ELECTRIC CURRENT TO A POWER SUPPLY SYSTEM

BACKGROUND

Technical Field

The present invention relates to a method for controlling a feed arrangement having a wind energy installation for feeding electrical power or electrical energy into an electrical supply system. Furthermore, the present invention relates to such a feed arrangement. Furthermore, the present invention relates to a wind farm having a plurality of wind energy installations and at least one feed apparatus.

Description of the Related Art

Wind energy installations which generate electrical current from wind and feed this electrical current into an electrical supply system are generally known. An example of such a wind energy installation is illustrated schematically in FIG. 1. Such a wind energy installation can therefore also be interpreted as a feed arrangement, which comprises a wind energy installation.

Conventionally, but at least preferably, wind energy installations are or have been operated in the so-called system-parallel operating mode. This is generally understood to mean that the respective wind energy installation generates in each case as much electrical power as is possible owing to prevailing wind and feeds this electrical power into the electrical supply system. The electrical supply system, which will also synonymously be referred to as a network or system below, has compensated for or absorbed resultant fluctuations in the fed power i.e. the power that has been fed therein.

Such a system-parallel operating mode is problematic for the system with an increasing share of electrical power from wind energy installations in the system, however. It is desirable that wind energy installations also support the electrical system and can in particular adapt to the demand for power of the electrical system.

In this sense, solutions are already known in which wind energy installations can perform system-supporting functions. For example, U.S. Pat. No. 6,984,898 discloses a method in which the wind energy installation regulates its fed power depending on the system voltage. U.S. Pat. No. 6,891,281 discloses a method in which the power is regulated depending on a frequency of the voltage in the system. U.S. Pat. No. 7,462,946 describes a method for feeding electrical power into a supply system by means of a wind energy installation which can take account of a short circuit in the supply system. U.S. Pat. No. 6,965,174 proposes a method in which a wind energy installation feeding into the system adjusts a phase angle and therefore a reactive power component of the fed power depending on the system voltage in order also thus to make a contribution to the system support. U.S. Pat. No. 7,525,208 also proposes taking into account short circuits in the system.

All of these methods make a contribution to the system support, but do not resolve the fact that a wind energy installation can generate no more electrical power from the wind than the wind conditions prevailing in each case permit. To this extent, in particular an increase in power in respect of amplitude and also the temporal duration of such an increase are subject to narrow limits.

In order to be able to also achieve an increase in the fed power of a wind energy installation, EP 2 411 669 proposes achieving a short-term increase in power for supporting the network by virtue of the fact that power from the centrifugal mass of the rotating rotor of the wind energy installation is utilized. Such an increase in power is also subject to narrow limits which result not least from the maximum stored kinetic energy in the rotor. In addition, a certain degree of complexity is required to convert the kinetic energy of the rotor of the wind energy installation into electrical current in order to effect the desired increase in the fed electrical power.

The German Patent and Trademark Office has searched the following prior art in the priority application: DE 10 2009 018 126 A1 and DE 10 2008 052 827 A1.

BRIEF SUMMARY

One or more embodiments of the present invention may address one or more of the abovementioned problems. One embodiment is directed to a solution with which the feed of electrical power can be increased even with the use of a wind energy installation. It should be possible to implement this increase in the electrical power in a manner which is in particular as simple as possible, as quick as possible and as permanent as possible. A significant power increase should also be sought, in particular, if possible, by at least 10%, 20% or, where possible, even 50% or more.

An embodiment of the invention proposes a method in which a feed arrangement which has a wind energy installation is controlled. The control takes place in such a way that the wind energy installation generates electrical power. It is noted that, in this case, the generation of electrical power or generation of electrical energy is understood to mean the conversion of power or energy in another form into electrical power or energy. Therefore, the wind energy installation generates electrical power in that it converts energy from the wind into electrical energy.

A first portion of the electrical power generated in this way is fed into the electrical supply system. A second proportion of the electrical power generated by the wind energy installation is supplied to an electrical consumer for consumption. An electrical consumer is understood to mean a consumer in the electrical sense, namely which draws the electrical power. The way in which said consumer then uses the electrical power is initially irrelevant, although there are preferred consumers, as will be described further below.

Preferably, at least one system state of the electrical supply system and/or the wind is monitored or observed. In this case, various system states come under consideration, as will be described further below. However, the monitoring of the system state at least on evaluation goes beyond that which a feed arrangement in any case needs to take into consideration, namely frequency, phase and amplitude of the voltage in the system, in particular at the system feed point at which the feed arrangement feeds the electrical power of the system.

Depending on this at least one monitored system state and/or depending on the wind, the second proportion of the generated electrical power supplied to the consumer is now wholly or partially reduced and added to the first electrical proportion. The first proportion of the electrical power is thus increased by this reduced proportion and correspondingly the electrical power which is fed into the supply system is increased.

A wind-dependent reduction can also be realized by virtue of the fact that the fed power is kept constant. The second proportion of the generated power can then be dependent on the fluctuation in the total generated electrical power. The information on the wind then has some influence on the information on the generated electrical power.

In particular, a reduction in the second proportion which is dependent on the system state is proposed.

If, therefore, on the basis of the at least one monitored system state it is identified or assumed or expected that it is advantageous to increase the power to be fed into the system, this can take place in a simple manner by virtue of a proportion of the electrical power supplied to the consumer being diverted in order to be fed into the system. This has the advantage, inter alia, that it becomes possible in a simple manner to provide additional electrical power quickly. If appropriate, it may be necessary to set up the electrical consumer such that suddenly less power or even no more power is available. For this purpose, the consumer can be set up or else selected correspondingly.

Instead of the system state or in addition to the system state, it is proposed to monitor the state of the wind, in particular the wind strength. As a result, it is proposed to keep the fed electrical power, i.e., the first proportion of the generated electrical power, as constant as possible unless a state of the system makes it necessary or advisable to change this fed electrical power in terms of its amplitude.

Preferably, the electrical consumer is a conversion apparatus for converting electrical power into another energy form, in particular the consumer is a conversion apparatus which generates a gas or a liquid as energy carrier. For example, hydrogen can be generated by electrolysis. Furthermore or in addition, methane can be produced by a methanization process and fed into a gas system and/or a gas store. Therefore, a consumer is provided which can draw both a large quantity of electrical power, depending on the dimensions of this conversion apparatus, and which can also readily reduce its power. If the input power of such a conversion apparatus is reduced, it produces correspondingly less gas or possibly even no gas at all. This state can in principle last as long as desired.

A reduction in the electrical power supplied to the conversion apparatus can take place in a very short period of time, for example within a few milliseconds (ms). Even if the conversion apparatus requires more time to reduce or shutdown the gas production, a corresponding buffer store can be provided for this purpose.

One embodiment proposes that of the electrical power generated by the wind energy installation, a third proportion is supplied to an electrical store. Although it is also conceivable in principle for in this case the second proportion to contribute a value of 0, preferably the electrical power should, in accordance with this embodiment, be divided into three proportions which can have different values. In this case, the first proportion is fed into the supply system, the second proportion is used for the consumer, in particular a conversion apparatus, and the third proportion is used for charging an electrical store.

Depending on the at least one monitored system state, in particular when a corresponding demand on the supply system is assumed, or this is to be expected, electrical power can be drawn from the electrical energy store and fed into the electrical supply system. In addition or as an alternative, the third electrical proportion which is used for charging the energy store is also changed for feeding into the supply system, depending on one or more detected relevant system states. Thus, in a very short period of time, the fed electrical power can be increased by the second and the third proportion, with the result that, in a very short period of time, switchover can take place such that all of the electrical power generated by the wind energy installation or by the plurality of wind energy installations is fed into the supply system. Furthermore, in order to also achieve a power increase at least for a short period of time during feeding, electrical energy which is buffer-stored in the electrical store can be used to increase the fed power to above the power made available in each case at that time by the wind energy installation or wind energy installations.

This case can be provided in particular for short-term exceptional situations. Such an exceptional situation can result from measurements in the system, or a situation can also be known in advance, for example when an industrial installation switches on a large consumer at a known time and as a result produces a short-term power demand peak.

It is clear that feeding the third proportion of the generated power into the electrical store cannot take place permanently at high power. Preferably, the electrical energy store is controlled or the third proportion of the generated electrical power is adjusted in such a way that the electrical store is always fully charged in order to have as much reserve power available as possible. However, the electrical energy store can also be used to provide its energy not only in exceptional situations but to thereby quite generally react to a fluctuating system demand or compensate for fluctuations in the wind.

Diverting the second proportion of the power or some of this for feeding in particular provides a quick possible way of reacting to a sudden power demand, or even to have a system-supporting effect in the event of a fault if such a fault event can be counteracted with an increased power feed. This diversion of the second proportion of the power is in particular very quickly possible because the required electrical power is already available as the electrical energy.

At the same time, diverting this second proportion can also take place variably such that a stabilization of the feed of electrical power into the system takes place. In other words, it is possible to achieve a situation in which a constant power is fed into the electrical system despite fluctuating wind. Stabilization of the feed is thus possible. Even such a stabilization can have an advantageous effect on the system stability because the feed is uniform and, as a consequence of this, unexpected fluctuations can also be avoided. In other words, it is possible to counter misgivings in respect of a problem for the system stability in wind energy installations owing to the fact that there is the theoretical risk that a great number of wind energy installations suddenly, in uncoordinated fashion, feed less power or more power at the same time which, in an extreme case, would result in a collapse of the system. Although these misgivings appear to be ungrounded, depending on the wind energy installations used, or at least do not represent such a considerable problem as is often seen, the proposed stabilization can eliminate such misgivings.

The use of the electrical store can likewise promote such a stabilization and in addition an increase in the power that can be fed can go beyond the prevailing wind power and therefore in principle also beyond the rated power of the wind energy installation or wind energy installations involved.

The monitoring of at least one system state can be or include monitoring the frequency in the electrical supply system. The frequency in the supply system can in particular be an indicator of the power demand in the system. If the frequency increases beyond the rated frequency, i.e., 50 Hz in the synchronous grid of Continental Europe or 60 Hz in the US power grid, this is an indicator of a surplus of power in the system. If the frequency decreases, in particular below a nominal frequency, in particular the rated frequency of the system, this is an indicator of an excess demand for electrical power in the system. Preferably, it is therefore proposed to divert the second and/or the third proportion of the power wholly or partially for feeding and to make this dependent on a reduction in the frequency in the system below a predetermined limit value.

Preferably or in addition, the voltage in the electrical supply system can be monitored, namely in terms of its amplitude. In particular, in this case the amplitude of the root mean squared (rms) value of the voltage or a similarly represented value of the voltage is used. In particular, diverting the second and/or the third proportion of the power wholly or partially, as described, can be made dependent on whether the voltage in the electrical supply system falls below a predetermined voltage limit value.

The described diversion can also be quantitatively dependent on the monitored system state. Preferably, the more power is diverted for feeding, the further the frequency in the electrical supply system, namely the so-called system frequency, falls below a predetermined limit value. Further preferably, the more electrical power is diverted for feeding, the further the voltage in the electrical supply system, namely the so-called system voltage, falls below a predetermined voltage limit value. Both in the frequency-dependent proposal outlined and also in the voltage-dependent proposal described, the diversion of the power can increase linearly with further-decreasing frequency or further-decreasing voltage up to a limit value.

Preferably or in addition, the system state is monitored by virtue of the fact that an external signal is evaluated. Such an external signal is in particular one which is transmitted by the operator of the supply system, the so-called system operator. As a result, for example, other responses from other produces in the system can also be taken into consideration. As a result, it is possible in particular to avoid several producers in the system, of which the feed arrangement can form one producer, operating in opposition to one another in terms of their regulation. Furthermore, by virtue of taking into consideration a signal from the system operator, a future event can also be taken into consideration, such as, for example, the planned connection or disconnection of a producer or consumer.

Further preferably or in addition, it is proposed that, in order to monitor at least one system state, a present demand for electrical power of the supply system is determined, in particular an excess demand, i.e., more demand than is provided at that time in each case by the producers in the supply system. As described, this can take place with the aid of monitoring of the frequency. Further possibilities consist in that specific consumption measurements are performed which can be implemented wholly or partially by the consumers themselves. In particular, this also takes into consideration the possibility that, in the future, the consumers and producers of a system could be interlinked in terms of information technology to a greater extent and correspondingly plan their demand or their supply and also communicate with one another. Such information can be evaluated by the feed arrangement. Preferably, however, it is assumed that a preevaluation takes place for consumer groups or all consumers, and only the result of such an evaluation is transmitted to the feed arrangement as demand and can correspondingly be taken into consideration as a system state.

Further preferably, it is proposed to monitor a change in the frequency of the electrical supply system, i.e., a change in the system frequency, as system state. In particular, a quick or undesirably quick change in the system frequency can be an indicator not only of an excess demand or a surplus but also of the threat of a critical system state. For example, a quick fall in the system frequency can be an indicator of an alarming increase in power demand in the system. In particular, a quick drop in the system frequency can make it necessary to divert the power for feeding quickly. For example, by virtue of a switchover, the second proportion of the generated power and/or the third proportion of the generated power can be made available immediately and completely for feeding. A considerable amount of additional power can thus be made available in an extremely short period of time for feeding, with it being possible for this to be fed in permanently.

Preferably, a limit value is predetermined for a change in frequency and it is proposed that a diversion of the second and/or third proportion of the generated electrical power for feeding into the supply system is introduced when a negative change in the frequency, i.e., a frequency drop, falls below this limit value, i.e., when its magnitude exceeds the magnitude of this limit value.

Preferably, two or more of these proposals for monitoring the system states, which proposals do not constitute an exclusive list, can be combined with one another. For example, it is proposed that a specific frequency drop can still be tolerated when the absolute value of the frequency is still high, in particular above a nominal value, in particular above the rated frequency. If, however, the system frequency has this nominal value, in particular the rated frequency, or is below this value, the same frequency drop can result in the described diversion of the power for feeding being initiated. Likewise, the evaluation of the system voltage and/or the evaluation of the system frequency and/or the evaluation of the system frequency change can also result in different results for the diversion of the power, for example depending on whether the system operator, via a signal, is already giving notice of corresponding countermeasures which already alleviate a supposedly identified problem. The evaluation can give a different result when the system operator transmits a signal which is still likely to result in an increase in the identified problem. Likewise, the consideration of an in particular present demand analysis of the consumers can influence the result of the evaluation of the system state. If it is known, for example, that a notable consumer is disconnecting itself from the system, electrical power can first cease to be drawn from an additional feed.

An embodiment proposes that the second proportion of the generated electrical power supplied to the consumer is added completely to the first proportion of the electrical power fed into the electrical supply system, in particular such that the second proportion of the generated electrical power is diverted by a switchover operation such that, together with the first proportion, it is ready to be fed into the electrical supply system. In addition or as an alternative, the third proportion of the generated electrical power supplied to the electrical store can be added completely to the first proportion of the electrical power fed into the electrical supply system.

Preferably, the second and/or third proportion of the electrical power is diverted wholly or partially in such a way that the power is introduced into a DC voltage intermediate circuit of an inverter which in principle implements the feed into the electrical system. Preferably, for this purpose, the feed arrangement is in principle designed in such a way that the wind energy installation generates electrical power and rectifies this power and provides it as DC voltage. From this DC voltage, first the division into the first, second and/or third proportion of the power takes place. The first proportion of the power is made available in this form, namely as DC voltage, to the DC voltage intermediate circuit, and the inverter generates the power to be fed correspondingly according to frequency, phase and amplitude.

If the second and/or third proportion of the power is now diverted for feeding, this takes place primarily such that the respective proportion of the total electrical power made available as DC voltage is no longer drawn, or no longer completely drawn, from the wind energy installation and therefore is directly available in the DC voltage intermediate circuit and can be fed. In other words, an embodiment proposes that the diversion of the second and/or third proportion of the electrical power takes place in a simple manner by virtue of the fact that this second and third proportion is no longer drawn and instead the total electrical power provided by the wind energy installation flows directly and completely into the DC voltage intermediate circuit and is ready for feeding.

It is thus also clear that the increase in the fed electrical power can take place spontaneously and in a simple manner because the feeding inverter normally continues to operate and merely has immediately more electrical power available for feeding. To this extent, it is only necessary to take the precaution that the inverter, which can also be formed from a plurality of individual inverters which are preferably coupled via the DC voltage intermediate circuit, needs to be designed for feeding the total maximum power that can be generated by the wind energy installation or wind energy installations.

Furthermore, a feed arrangement for feeding electrical power into an electrical supply system is proposed. This feed arrangement comprises at least one wind energy installation for generating electrical power, at least one feed means for feeding at least one first proportion of the electrical power generated by the wind energy installation, in particular an inverter, an electrical consumer for consuming at least one second proportion of the electrical power generated by the wind energy installations and a control device for controlling the feed arrangement and in particular also for controlling a power flow.

The control device is set up to implement a method according to at least one of the above described embodiments. Such a setup for implementing the control method can consist in that the control device is coupled to the inverter and a switchover or diverting device. In particular, the control device can drive the switchover or diverting device in such a way that, optionally, a second proportion of the generated electrical power is passed wholly or partially from the at least one wind energy installation to the consumer or to the inverter. Preferably, the control device has a corresponding evaluation unit, which can be wholly or partially part of a common control program, and which correspondingly implements the evaluation of at least one system state.

Preferably, the electrical consumer is a conversion apparatus for converting the electrical power, namely the second proportion of the electrical power supplied to it, into another energy form. In particular, a conversion apparatus which produces a gas, such as hydrogen and/or methane or a liquid, with the aid of the electrical power supplied to it is proposed as this electrical consumer.

In accordance with a further configuration, it is proposed that the feed arrangement has an electrical store for storing a third proportion of the electrical power generated by the wind energy installation and/or that the feed arrangement has an inverter with a DC voltage intermediate circuit, which inverter substantially implements the feeding of the first proportion of the electrical power and therefore possibly all of the electrical power generated by the wind energy installation into the electrical supply system. It goes without saying that it is possible for yet further components, such as system inductors, for example, to be provided for feeding, which is conventional to a person skilled in the art.

Furthermore, a wind farm is proposed which has a plurality of wind energy installations and a feed arrangement as in accordance with one of the above described exemplary embodiments. The wind farm therefore comprises a plurality of wind energy installations, at least one feed means such as an inverter, and a consumer, in particular a conversion apparatus. A large quantity of electrical power can thus be generated with this wind farm. Depending on the number and size of the wind energy installations, the wind farm can even in total assume the order of magnitude of a large-scale power plant. This is preferably operated in combination with a correspondingly large consumer, in particular with a conversion apparatus, which can draw a large share of the generated electrical power, preferably over 5% of the rated power of the wind farm, over 10%, over 20% or preferably over 50% of the rated power of the wind farm, in particular for producing a gas such as hydrogen or methane.

Both in connection with the proposed wind farm and in connection with only one or few wind energy installations, reference is made to the fact that, although it is desirable that the conversion apparatus converts the supplied second proportion of the electrical power into another energy carrier such as hydrogen or methane with as few losses as possible, the invention is not dependent on this. It should be noted here that nowadays the system stability is of high significance, which justifies sudden losses of generated electrical power. In addition, the conversion apparatus is operated in particular when there is only a low demand for electrical power in the system, i.e., at night, for example. Such a low power demand generally also results in a relatively low electricity price, however, with the result that conversion with a low level of efficiency can nevertheless result in a positive overall result during times at the low electricity price rate when there is a conversion back to the other energy form at times of high demand and therefore at the high electricity price rate. Or when the energy is again provided at prices which are high, with the result that any loss as a result of poor efficiency is thus reduced or, in the optimum case, does not occur.

However, it is particularly important that, in the case of the increase in the power demand in the system, in particular in the case of a quick or even sudden rise in the power demand in the system, embodiments herein provide a possibility for immediately increasing the fed power.

BRIEF DESCRIPTION OF THE SEVERAL VIEWS OF THE DRAWINGS

The invention will now be explained in more detail below by way of example using exemplary embodiments with reference to the attached figures.

DETAILED DESCRIPTION

Figure 1:
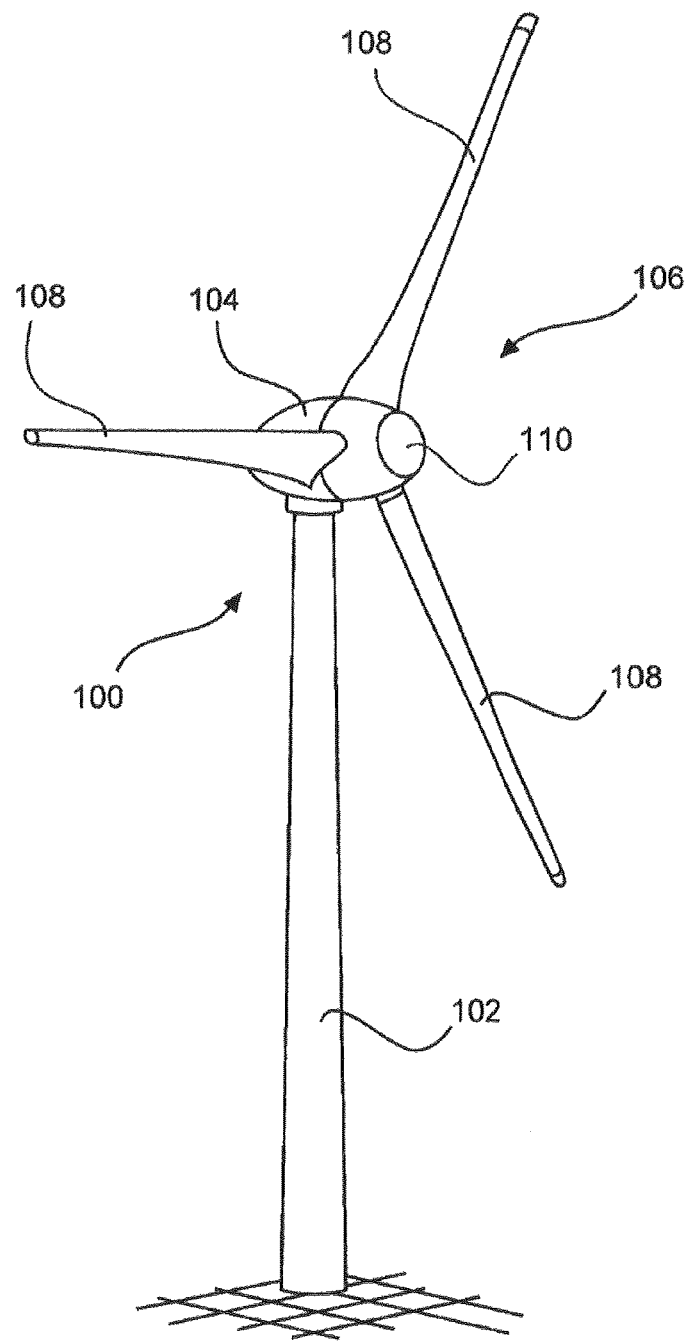
FIG. 1 shows a wind energy installation in a schematic view.

FIG. 1 shows a wind energy installation 100 with a tower 102 and a pod 104. A rotor 106 with three rotor blades 108 and a spinner 110 is arranged on the pod 104. The rotor 106 is caused to perform a rotary movement during operation owing to the wind and thereby drives a generator in the pod 104.

Figure 2:
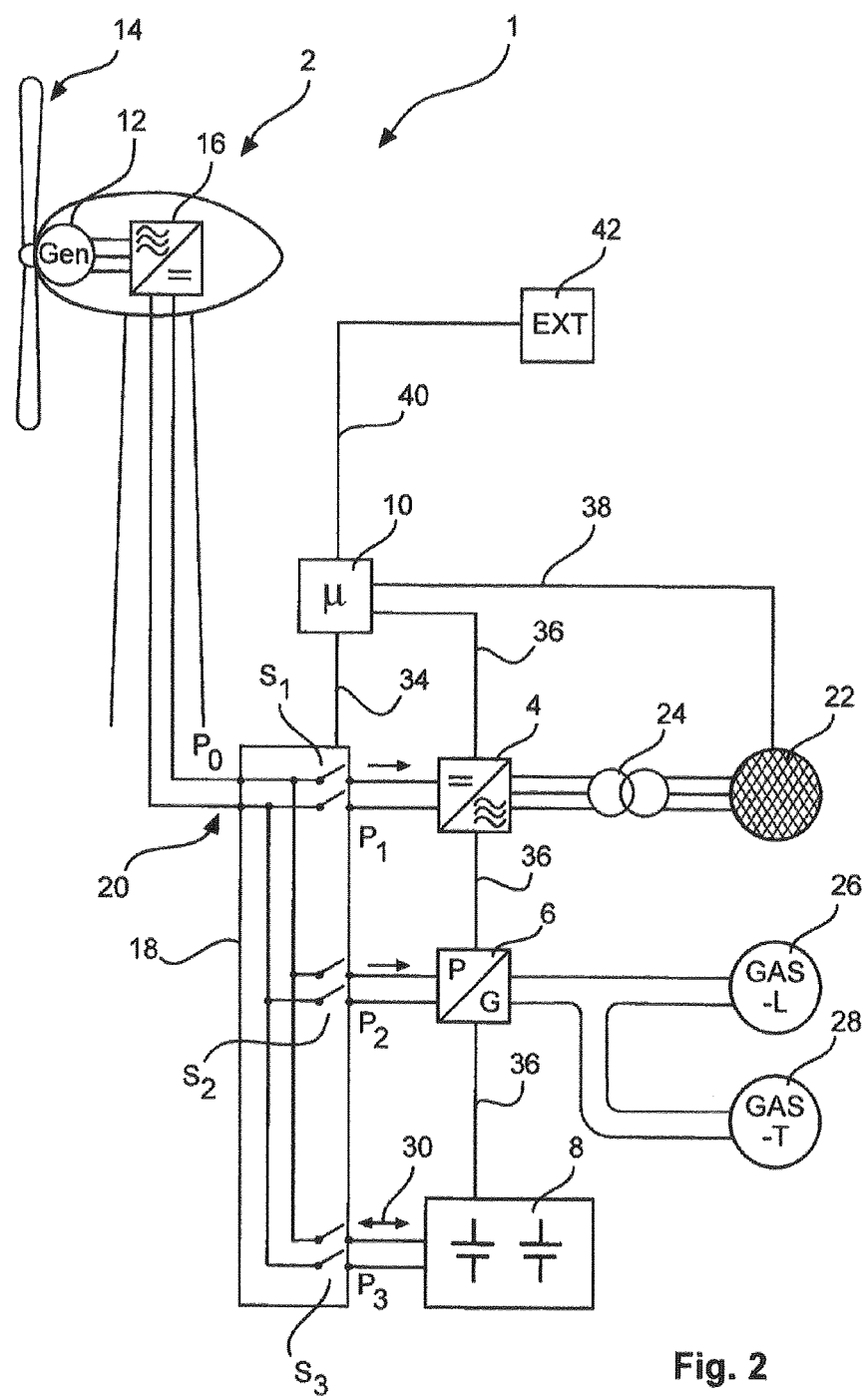
FIG. 2 shows a feed arrangement schematically in a simplified overview.

FIG. 2 shows a feed arrangement 1 with a wind energy installation 2, such as the wind energy installation 100 of FIG. 1, a feed means 4, such as an inverter, an electrical consumer 6, which in one embodiment is a power conversion apparatus 6, an electrical store 8 and a control device 10, which in the illustrated embodiment is a microcontroller 10.

During operation in accordance with one operating mode, in which there is sufficient wind, the wind energy installation 2 generates an electrical AC voltage by virtue of the generator 12, which is driven by the wind via the aerodynamic rotor 14. This generated AC voltage is supplied to a rectifier 16, which generates a DC voltage from the AC voltage, which is then supplied to a distribution unit 18. The distribution unit 18 is in particular understood to be a symbolic illustration of the power distribution described below. In practice, the power distribution which is intended to be illustrated by the distribution unit 18 can also manage without any physical embodiment of such a distribution unit 18.

In any case, FIG. 2 illustrates, with the distribution unit 18, the fact that first all of the electrical power generated by the wind energy installation 2 is supplied to said distribution unit. Any losses which may occur in the rectifier 16, for example, are not taken into consideration here. Therefore, all of the generated electrical power $P_0$ of the wind energy installation 2 is available at the distribution input 20. All of this electrical power $P_0$ is now divided into the first proportion or the first power proportion $P_1$, the second proportion or the second power proportion $P_2$ and the third proportion or the third power proportion $P_3$. Correspondingly, the equation $P_0=P_1+P_2+P_3$ applies. It is first assumed that the first, second and third power proportions $P_1$, $P_2$ and $P_3$ are each not equal to 0 and correspondingly the first, second and third proportion switches $S_1$, $S_2$ and $S_3$ shown symbolically and associated with the respective power proportion are closed.

Therefore, the first power proportion $P_1$ is supplied to the feed means 4, namely the inverter 4. In addition, the inverter 4 generates a corresponding alternating current for feeding to the electrical supply system 22, which is also referred to in simplified form below as system 22. In the example shown in FIG. 2, in addition a transformer 24 is illustrated which can transform the AC voltage generated by the inverter 4 into a higher voltage value if, for example, the feed is to a medium-voltage system. This transformer 24 is not absolutely essential, but it illustrates that the feed arrangement 1 and therefore the wind energy installation 2 can feed not only into a low-voltage system, which is generally also a small system, but also into a medium-voltage system and therefore a correspondingly large system, for example. In principle, however, feeding into a high-voltage system is also possible, in particular when a wind farm with a high capacity is provided and also depending on the system topology encountered at the installation site.

The second power proportion $P_2$ is supplied to the conversion apparatus 6, which can thus produce or convert a gas, which can be fed into a gas system or the like. Illustratively, as a representative of this, a gas system or gas pipeline 26 is referred to as GAS-L and a gas store or gas tank 28 is referred to as GAS-T. In principle, a gas store 28 or many gas stores can be part of the gas system 26.

The third power proportion $P_3$ is supplied to an electrical store 8 in order to charge said electrical store. The electrical store 8 is in this case symbolized as a battery store which can have a plurality of storage banks. However, other stores are also conceivable, such as capacitor banks, for example, which can be provided at least in supplementary fashion. The third power proportion $P_3$ can also in principle become negative, with energy thus being drawn from the electrical store 8. This is illustrated by the double arrow 30, whereas a single arrow 32 illustrates, both for the first power $P_1$ and for the second power $P_2$, that the power in each case only flows to the inverter 4 or to the conversion apparatus 6 although the conversion apparatus 6 can in principle also have a bidirectional embodiment.

The inverter 4 is also preferably embodied as FACTS-compatible and/or can implement functions of a STATCOM. Both abbreviations are known in the field of power supply system technology and have the following meanings:

FACTS: flexible AC transmission system
STATCOM: static synchronous compensator

Therefore, the inverter 4 is set up not only to feed electrical power into the electrical power supply 22, but also to have a qualitative influence, in particular by influencing the phase angle of the fed power. At this juncture, mention should also be made of the fact that the feed arrangement is based on an electrical supply system which is not an island network. There are particular prerequisites, in particular in terms of frequency specifications and indicators and intervention possibilities in respect of system stability, for island networks.

In order to control the inverter 4, the conversion apparatus 6, the electrical store 8 and the distribution unit 18 or the functionality thereof, the control device 10 is provided. The control device 10 in this case provides a superordinate control which predetermines regulation or control objectives which are superordinate in particular to the inverter 4, the conversion apparatus 6 and the electrical store 8, in particular in respect of power distribution. In particular, the specific value for the first power proportion $P_1$, the second power proportion $P_2$ and the third power proportion $P_3$ can be translated in each case by internal control or regulation of the inverter 4, the conversion apparatus 6 and the electrical store 8. The distribution unit 18 can control the switch position of the three switches $S_1$, $S_2$ and $S_3$, if appropriate.

For this superordinate control, the control device 10 can use one of the control lines 34 or 36. In FIG. 2, the first control line 34 is coupled to the distribution unit 18 and the second control line 36 is coupled to the inverter 4 and, from there, is looped through to the conversion apparatus 6 and to the electrical store 8. The specific topology of the control lines can in principle be as desired and can be implemented in an otherwise known manner using known topologies.

In order to detect at least one system state of the supply system 22, in addition a system data line 38 is provided, via which the control device receives information such as frequency and voltage amplitude of the system voltage of the system 22, for example. Further data can be supplied to the control device 10 via an input data line 40, in particular data from an external unit such as a system operator or a central evaluation unit for evaluating the present consumer demand, for example. Representative of such and further external evaluation units is the block 42, which is denoted by EXT as representative of an external unit.

In principle, the first and second control lines 34, 36, the system data line 38 and the input data line 40 can transmit different signals, and the control device 10 can thus both receive and transmit signals. In this case, the primary information direction of the first and second control lines 34, 36 is from the control device 10 to the respectively connected devices, namely the inverter 4, the conversion apparatus 6, the electrical store 8 and the distribution unit 18. In the case of the system data line 38 and the input data line 40, the information direction is in particular towards the control device 10. However, it is also possible, for example, for information to be supplied from the inverter 4 to the control device 10. This information can represent both specific states of the inverter 4 and, if appropriate, contain system information, i.e., when the inverter 4 itself has corresponding measurement means for system states, which is mentioned here for reasons of completeness.

If the control device 10 now establishes that there is a demand for power diversion, i.e., a change in the division of power between the power proportions $P_1$, $P_2$ and $P_3$, there is first the possibility of giving this information or corresponding control commands to the relevant units, namely in particular the inverter 4, the conversion apparatus 6, the electrical store 8 and the distribution unit 18. Depending on this, the conversion apparatus 6 can reduce its power, with the result that the second power proportion $P_2$ is reduced, possibly to 0. Correspondingly, the electrical store 8 can reduce its power consumption, namely reduce the decrease in the third power proportion $P_3$, and possibly reverse this, with the result that the electrical store emits power.

A different or supplementary variant is that the distribution unit 18 opens the second switch $S_2$ and then immediately reduces the second power proportion $P_2$ to 0. Likewise, the third switch $S_3$ can be opened in order to reduce the power which is supplied to the electrical store 8 likewise immediately to 0. In this case, the first switch $S_1$ is closed.

In order to make available energy from the electrical store 8 for feeding, the third switch $S_3$ can be closed again. In respect of the electrical store, it should be mentioned that said electrical store in principle does not draw any power or draws little power during permanent operation and during running operation in contrast to the conversion apparatus 6. Finally, the electrical store can draw power until it is charged to its maximum.

The electrical conversion apparatus 6 therefore has a different significance than the electrical store 8 and thus a corresponding treatment is proposed. Accordingly, the operation can in principle be described on the basis of a concept which initially does not take into consideration the electrical store 8. With this consideration, the third switch $S_3$ would be open and the third power proportion would be $P_3=0$.

The conversion apparatus 6 preferably operates in the continuous operating mode by virtue of it receiving, for example, approximately 50% of the electrical power generated by the wind energy installation 2 during continuous operation and continuously producing gas or another energy carrier. In this example, the second power proportion $P_2$ is 50% of the total electrical power $P_0$ provided. Correspondingly, the first power proportion $P_1$ is then also 50% of the total power $P_0$. If, for simplicity's sake, even if this is the rarer case depending on the installation site of the wind energy installation 2, it is assumed that there is nominal wind and therefore rated power, a 2 MW wind energy installation 2 can provide 2 MW of power as $P_0$, for example, of which one 1 MW is fed into the system 22 as first power proportion $P_1$ from the inverter 4. At the same time, the conversion apparatus receives 1 MW for producing the gas. From the point of view of the electrical supply system 22, accordingly a 1 MW wind energy installation is provided which feeds into the system.

If the demand for electrical power in the system 22 now increases suddenly or gradually, this 1 MW electrical source can increase its power, namely to 2 MW in the example. In fact, however, no power increase takes place because the wind energy installation continues to produce 2 MW but, from the point of view of the system, a power increase takes place. This power increase can in this case be implemented continuously, whether it be for a few seconds, a few minutes, a few hours, days or weeks, since the conversion apparatus 6 is in this case designed in such a way that it is possible to dispense with the gas production or other production at any point in time or for this gas production or other production to be reduced at any time.

In addition, the inverter 4 can still feed the 1 MW, mentioned by way of example, into the system 22 when the wind speed is reduced. In the example mentioned, the wind speed can decrease to such an extent that the wind energy installation 2 produces only half the rated power, namely 1 MW. In this case, it is still possible for 1 MW of power to be fed from the inverter 4 into the system 22, i.e., when in this case no more power is supplied to the conversion apparatus 6.

In addition, the electrical store 8 can also be used, with this electrical store being suitable in particular for additionally providing electrical power for feeding for a comparatively short period of time, depending on the dimensions of the store capacity.

The described concept can be implemented particularly easily by virtue of the fact that the power distribution, namely the division of the total power $P_0$ into the first, second and third power proportions $P_1$, $P_2$ and $P_3$, takes place on the DC voltage plane and in particular is added to the inverter 4 directly to its DC voltage intermediate circuit. The change in the first power proportion $P_1$, which therefore flows directly into the DC voltage intermediate circuit of the inverter 4, is in principle only noticeable owing to the fact that the current flowing into the DC voltage intermediate circuit is increased. The voltage of the DC voltage intermediate circuit can remain substantially the same.

Figure 3:
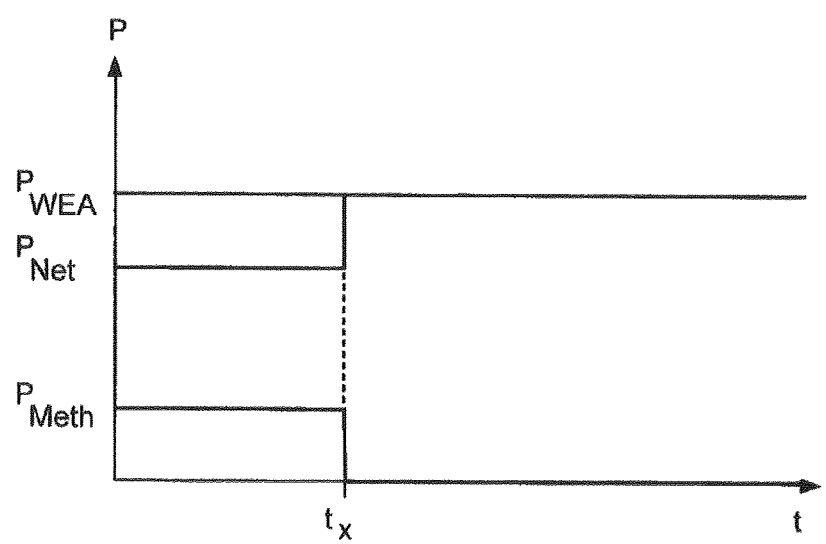
FIG. 3 shows a graph illustrating power divisions.

The graph in FIG. 3 represents, for illustrative purposes, power profiles P over time t. In this case, a feed arrangement which comprises a wind energy installation WEA and a consumer, namely a conversion apparatus for producing methane, is assumed, by way of example. An electrical store is not provided for the embodiment under consideration here or is not taken into consideration.

The graph is based on a situation in which the wind energy installation substantially generates a constant power $P_{WEA}$. Of this power $P_{WEA}$, first a first proportion is fed as $P_{Net}$ into an electrical supply system and the remaining second proportion $P_{Meth}$ is supplied to the conversion apparatus. Losses are ignored here. At time $t_x$, there is suddenly an increased demand for power $P_{Net}$ to be fed and, for this, the second proportion $P_{Meth}$ is reduced, namely to zero in the example shown, with the result that this proportion can be added to the fed power $P_{Net}$. $P_{Net}$ increases correspondingly and increases to the value of the generated power $P_{WEA}$. Therefore, the fed power $P_{Net}$ can be increased to this higher value suddenly by the proposed method. This increased power $P_{Net}$ can also be maintained for a relatively long period of time, as long as there is sufficient wind.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling a feed arrangement having a wind energy installation for feeding electrical power into an electrical supply system, the method comprising:
    generating electrical power from wind using the wind energy installation;
    feeding a first proportion of the generated electrical power into the electrical supply system;
    supplying a second proportion of the generated electrical power to an electrical consumer configured to consume the supplied second proportion of the generated electrical power;
    supplying a third proportion of the generated electrical power to an electrical store;
    monitoring at least one of a system state of the electrical supply system and the wind; and
    depending on at least one of the monitored system state of the electrical supply system and the wind, reducing an amount of the second proportion of the generated electrical power that is supplied to the consumer and either increasing an amount of the first proportion of the generated electrical power that is fed into the electrical supply system or maintaining the amount of the first proportion of the generated electrical power that is fed into the electrical supply system to stabilize the electrical supply system; and
    the method comprises at least one of:
        depending on the at least one monitored system state, drawing electrical power from the electrical store and feeding the drawn electrical power into the electrical supply system; and
        depending on the at least one monitored system state, reducing the third proportion of the generated electrical power that is supplied to the electrical store and increasing the first proportion of the electrical power.

2. The method according to claim 1, wherein the electrical consumer is a conversion apparatus for converting the generated electrical power into another energy form.

3. The method according to claim 1 wherein, monitoring at least one system state of the electrical supply system comprises at least one of:
    monitoring a frequency of the electrical supply system;
    monitoring a voltage of the electrical supply system;
    evaluating an external signal of the supply system;
    determining a present demand for electrical power by the supply system; and
    monitoring a change in frequency of the electrical supply system.

4. The method according to claim 1 wherein:
    the second proportion of the generated electrical power supplied to the electrical consumer is added to the first proportion of the electrical power fed into the electrical supply system; and
    the third proportion of the generated electrical power is added to the first proportion of the electrical power fed into the electrical supply system.

5. The method according to claim 1, wherein the feed arrangement includes an inverter with a DC voltage intermediate circuit, and at least one of the first and second proportion of the electrical power is at least partially diverted such that the electrical power is introduced directly into the DC voltage intermediate circuit.

6. A feed arrangement for feeding electrical power into an electrical supply system, the feed arrangement comprising:
    a wind energy installation for generating electrical power;
    a feed means for feeding at least one first proportion of the electrical power generated by the wind energy installation;
    an electrical consumer for consuming at least one second proportion of the electrical power generated by the wind energy installation; and
    a control device for controlling the feed arrangement, wherein the control device is configured to implement a method according to claim 1.

7. The feed arrangement according to claim 6, wherein the electrical consumer is a conversion apparatus for converting the electrical power into another energy form.

8. The feed arrangement according to claim 6, comprising the electrical store for storing the third proportion of the electrical power generated by the wind energy installation.

9. A wind farm comprising:
    a plurality of wind energy installations configured to generate electrical power; and
    a feed arrangement including:
        an inverter configured to feed a first proportion of the electrical power generated by the plurality of wind energy installations;
        an electrical consumer for consuming a second proportion of the electrical power generated by the plurality of wind energy installations;
        an electrical store for storing a third proportion of the electrical power generated by the wind energy installation; and
        a control device for controlling the feed arrangement, wherein the control device is configured to:
            reduce a first amount of the second proportion of the generated electrical power that is supplied to the consumer and to increase a second amount of the first proportion of the generated electrical power that is fed into the electrical supply system to stabilize the electrical supply system; and
            at least one of:
                depending on at least one monitored system state, draw electrical power from the electrical store and feed the drawn electrical power into the electrical supply system; and
                depending on the monitored system state, reduce the third proportion of the electrical power and increase the first proportion of the electrical power.

10. The method according to claim 1, wherein the amount of the second proportion of the generated electrical power that is reduced corresponds to the amount of the first proportion of the generated electrical power that is increased.

11. The method according to claim 1, wherein reducing the amount of the second proportion of the generated electrical power that is supplied to the consumer comprises reducing the amount of the second proportion to zero.

12. The method according to claim 2, wherein the other energy form is gas.

13. The method according to claim 4, wherein the second proportion of the generated electrical power supplied to the electrical consumer is added to the first proportion of the electrical power fed into the electrical supply system by diverting the second proportion of the generated electrical power through a switchover operation such that the second portion together with the first proportion is ready to be fed into the electrical supply system.

14. The feed arrangement according to claim 8, wherein the control device is a microcontroller.

15. The feed arrangement according to claim 9, wherein the other energy form is a gas.

16. The feed arrangement according to claim 6, comprising an inverter with a DC voltage intermediate circuit for feeding the first proportion of the electrical power into the electrical supply system.

17. The feed arrangement according to claim 6, wherein the feed arrangement comprises a plurality of wind power installations.

18. The method according to claim 1, wherein the amount of the first proportion of the generated electrical power that is fed into the electrical supply system is increased in response to an increase in power demand by the electrical supply system or the amount of the first proportion of the generated electrical power that is fed into the electrical supply system is maintained in response to a drop in a power supplied by the wind energy installation.

19. A method for controlling a feed arrangement having a wind energy installation for feeding electrical power into an electrical supply system, the method comprising:

generating electrical power from wind using the wind energy installation;
feeding a first proportion of the generated electrical power into the electrical supply system;
supplying a second proportion of the generated electrical power to an electrical consumer configured to consume the supplied second proportion of the generated electrical power;
supplying a third proportion of the generated electrical power to an electrical store;
monitoring at least one of a system state of the electrical supply system and the wind; and
in response to a reduction in the wind, reducing an amount of the second proportion of the generated electrical power that is supplied to the consumer and maintaining an amount of the first proportion of the generated electrical power that is fed into the electrical supply system to maintain stability of the electrical supply system; and
the method comprises at least one of:
depending on the at least one of the system state of the electrical supply system and the wind, drawing electrical power from the electrical store and feeding the drawn electrical power into the electrical supply system; and
depending on the at least one of the system state of the electrical supply system and the wind, reducing the third proportion of the generated electrical power that is supplied to the electrical store and increasing the first proportion of the electrical power.

* * * * *